May 2, 1967 F. N. SOMMER 3,316,586
DEVICES FOR FEEDING UNCURED PLASTIC SHEET
TO A MOVABLE SHEET-RECEIVING DEVICE
Filed Dec. 17, 1964
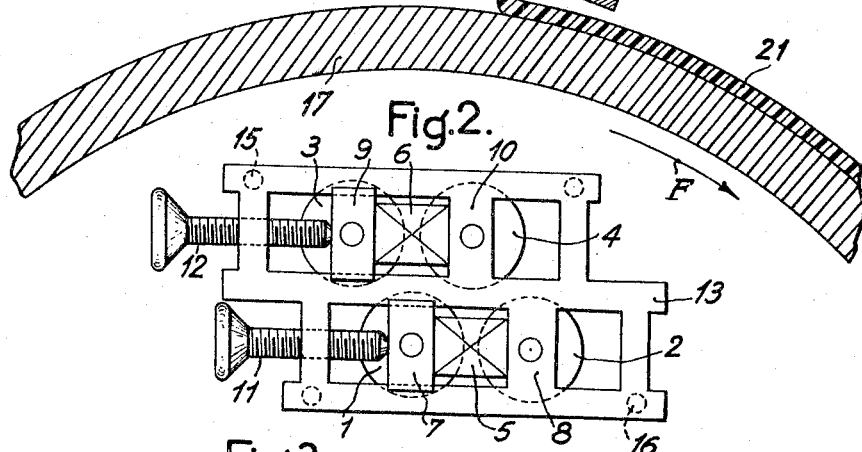

3,316,586
DEVICES FOR FEEDING UNCURED PLASTIC SHEET TO A MOVABLE SHEET-RECEIVING DEVICE
Francois Noel Sommer, Paris, France, assignor to S.E.T.E.P., Societe d'Etudes, de Recherches et d'Experimentations Industrielles de Tous Procedes Nouveaux pour l'Alliance des Textiles et des Matieres Plastiques, Ardennes, France
Filed Dec. 17, 1964, Ser. No. 419,110
Claims priority, application France, Dec. 19, 1963, 957,781, Patent 1,387,966
2 Claims. (Cl. 18—2)

This invention relates to an improved device for feeding uncured plastic sheet to a movable sheet-receiving device, this improved device being characterized in that it comprises at least one pair of calendering rolls fed with uncured plastic material and so arranged as to have an adjustable gap therebetween to determine the thickness of the uncured plastic sheet obtained therethrough, and that one of said calendering rolls rotates at a higher speed than the other roll in order to cause the thus formed plastisol sheet to adhere to said one roll and thus guide said sheet along its path towards the movable sheet-receiving device.

Practical tests showed that the slower roll should rotate at a speed representing from 4 to 6 tenths the speed of the faster roll.

Advantageously, both rolls should have the same diameter, but this requirement is not compulsory for carrying out the invention.

Of course, the peripheral velocity of the faster roll which acts as a guide member to the uncured calendered sheet adhering thereon should be strictly equal to the linear or peripheral velocity (according to cases) of the sheet-receiving device, since this sheet is transferred by simple gravity and at its final thickness from said faster calendering roll to said movable receiving device.

It is also an obvious requirement that the two calendering rolls should operate at room temperature, at least at a temperature below 30° C., to avoid any pregelling of the uncured plastic sheet material. Under these conditions, it is necessary or advantageous to cool the rolls for example by circulating cold water therein in order to prevent the vicinity of the movable receiving device from increasing the temperature of the sheet when this receiving device is of the heating type with a view to cause the gelling of the uncured plastic sheet deposited thereon. The uncured plastic sheet adhering on the faster calendering roll tends to detach itself naturally from this faster roll and to fall by gravity onto the movable sheet-receiving device. However, to avoid any incident, a doctor or like scraper is preferably arranged along the lowermost generatrix of the calendering roll on which the uncured plastisol sheet is caused to adhere. This doctor should be very sharp, made from flexible metal and so hard that it is the doctor blade that will wear out first, not the roll.

It was found that at certain times some difficulties could be experienced as far as the feeding of uncured plastic material in pasty form to the calender consisting of said two rolls is concerned, with the consequence that solutions of continuity might develop in the uncured plastic sheet formed therebetween.

To avoid this drawback another improvement according to this invention consists in arranging two pairs of calendering rolls acting similarly but in series.

The second set of rolls is disposed advantageously above the first one feeding the sheet-receiving device so that the plastic sheet delivered from said second set of rolls falls exactly into the nip of said first set. To this end, the axis of the faster calendering roll of the second set lies approximately in the vertical plane passing between the two calendering rolls of said first set so as to be substantially equally spaced from these two rolls.

Preferably, the second set of calendering rolls comprises like the first one a doctor disposed along the lowermost generatrix of the faster roll to separate the plastic sheet from the surface of this roll.

Thus, the uncured plastic material in pasty form is fed to the second pair of calendering rolls.

When the plastic paste is relatively thick it is rather difficult to produce relatively thin sheet stock from this material, that is, sheets having a thickness of the order of 0.5 millimeter. In this case, the use of two sets of calendering rolls proves to be particularly efficient, for the relative spacing or gap between the rolls of the second set is so adjusted that these rolls deliver a plastic sheet having a thickness corresponding to twice, three or four times the thickness of the final sheet contemplated, which is obtained by properly setting the gap between the rolls of the first set. Thus, for example, a 0.5-mm. sheet may be obtained by setting at 0.5 mm. the gap between the rolls delivering the sheet directly to the movable receiving device and at 2 mm. the gap between the rolls of the additional set of rolls. Of course, the peripheral velocities of the two faster rolls of the device should be adjusted accordingly, that is, the peripheral or circumferential speed of the faster roll of the second set of calendering rolls must be two, three or four times lower than that of the faster roll of said first set, so that the two sets operate with the same output of plastic material.

Advantageously, the surface condition of the calendering rolls should be as good as possible; however, these rolls may be simply polished without resorting to any specific precision or high-accuracy surface machining.

Of course, the metal lining covering these rolls or cylinders should be not only perfectly inert from the chemical point of view with respect to the plastic materials to be calendered, but also insensitive to any accidental moisture deposit. For these reasons the rolls should preferably but not compulsorily be lined with stainless steel or the like.

The movable sheet-receiving device on which the uncured plastic sheet is deposited by the improved feeding device of this invention may be of any suitable type, for example, a rotary drum or a belt conveyor. This receiving device may be of the heating type and in this case the plastic sheet deposited thereon will be gelled to produce a so-called "bare" sheet consisting of a plastic sheet without any support. If desired, this receiving device may carry a support on which the uncured plastic sheet is deposited; in this case the device is not heating and the plastic layer is gelled afterwards, for example, by causing same to contact rotary heating cylinders or drums according to the U.S. Patent No. 244,649 filed on Dec. 14, 1962.

This process of producing lining materials consisting of a plastic wearing layer deposited on a carrier or sublayer was actually carried out in practice and gave very satisfactory results, notably on account of the fact that the wearing layer is delivered by means of the feeding device of this invention instead of the conventional doctor.

In this respect it may be emphasized that the regularity of the thickness of the resulting plates or sheets is considerably greater than that of plates or sheets obtained by means of conventional doctor means, this constituting a considerably advantageous feature. Moreover, the improved device of this invention permits of adjusting the thickness of the plate, sheet or layer thus obtained with a considerably greater degree of precision than that afforded by the conventional doctor device. On the other hand, heretofore it was scarcely possible to scrape plastic pastes having a viscosity exceeding 90,000 poises, whereas the device of this invention permits of feeding plastic pastes having a viscosity of more than 250,000 poises. Under these conditions, plastic layers having a considerably lower plasticizer content can be deposited on the textile or like supports, this feature affording a substantial increase in the general mechanical properties and more particularly the wearing resistance notably in the case of floor lining products.

A specific form of embodiment of the feeding device according to this invention will now be described by way of example with reference to the accompanying drawing, in which:

FIGURE 1 is a diagram illustrating the principle of the device of this invention;

FIGURES 2 and 3 are diagrammatic views showing respectively in side elevation and in plan view from above an assembly comprising two calendering rolls constructed according to the teachings of this invention.

FIGURE 1 illustrates a feeding device constructed according to the teachings of this invention, which comprises two sets or pairs of calendering rolls, that is, a first set of two rolls 1, 2 revolving in opposite directions as shown by the arrows $f_1$ and $f_2$, and another set of two rolls 3, 4 revolving in opposite directions, as shown by the arrows $f_1$ and $f_2$. The first set is arranged in the vicinity of a movable receiving device, in this case a rotary drum 17 revolving in the direction of the arrow F, and the second set is mounted above the first one.

According to this invention one of the rolls of each set, namely the roll 2 on the one hand and the roll 4 on the other hand, revolves at a higher speed than the other roll of the same set.

Preferably, the two rolls of the same set have the same diameter.

The uncured pasty plastic material 18 is fed to the upper set of calendering rolls (3, 4).

The plastic sheet formed between the two calendering rolls 3, 4 adheres on the faster roll 4 and is separated therefrom by a doctor or like scraper 19 mounted along the lowermost generatrix of this roll 4.

The axis of the faster calendering roll 4 lies approximately in the vertical plane passing between the two calendering rolls 1, 2 of the first set, this plane being substantially equally spaced from these two rolls, so that the plastic uncured sheet delivered by the second set and separated from the faster roll 4 by the doctor 19 falls by gravity between the two rolls 1, 2 of the first set. After being calendered again between rolls 1 and 2, the plastic sheet adheres to the faster roll 2 of the first set of calendering rolls until it is separated therefrom by the doctor 20 mounted as in the case of doctor 19 along the lowermost generatrix of roll 2. The uncured plastic sheet 21 thus delivered by the feeding device described hereinabove falls by gravity onto the rotary drum or like member 17, which may be a heating cylinder on which the plastic sheet is gelled.

Of course, the peripheral velocity of the calendering roll 2 is equal to the peripheral velocity of the cylinder 17 receiving the plastic sheet.

If the rolls 1, 2 on the one hand and 3, 4 on the other hand have the same relative spacing the calendering rolls 2 have the same peripheral speeds. If, as in frequently advantageous occurrences, the relative spacing of rolls 3 and 4 is greater than that of rolls 1 and 2, so that the second set of rolls 3, 4 delivers a thicker plastic sheet than that delivered by the first set, the peripheral speed of roll 4 is so adjusted that the quantity of plastic sheets delivered thereby equals that delivered by roll 2.

FIGURES 2 and 3 illustrate diagrammatically a specific mounting of the two sets of calendering rolls.

The assembly comprising the four rolls is disposed in a welded frame structure comprising side members 13, 14 and bracing members 15, 16. The relative spacing of rolls 1, 2 on the one hand and 3, 4 on the other hand must be adjusted very accurately; to this end, liners 5, 6 disposed between bearings 7 and 8, on the one hand, and 9 and 10 on the other hand, which support the shafts of rolls 1, 2 and 3, 4 respectively, are used.

The bearings 8 and 10 supporting the shafts of rolls 2 and 4 are fixed. The other bearings 7 and 9 supporting the shafts of rolls 1 and 3 are slidably mounted in the side members 13 and 14 of the frame structure and these other bearings are pressed against the liners 5, 6 by means of screws 11, 12 provided with control handwheels and revolving in nuts (not shown) mounted in the aforesaid side members. The relative spacing of the rolls of each set may be altered by changing the set of liners. The calendering rolls are rotatably driven at the proper speed for each of them from conventional mechanical means.

Of course, various detail modifications may be brought to the specific form of embodiment of the device which is shown and described herein without departing from the spirit and scope of the invention as set forth in the appended claims. Thus, notably, the feeding device may comprise more than two sets of calendering rolls operated in series.

What I claim is:

1. Apparatus for shaping uncured plastic material into a sheet and feeding the sheet to a movable surface adapted to receive the sheet, comprising two pairs of calendering rolls, means to rotate the rolls of each pair in opposite directions and so that one of the rolls of each of the pairs is rotated at a higher peripheral speed than the other of the rolls of the respective pair and the faster and slower rotating rolls of one of the pairs rotate in the same direction as the faster and slower rotating rolls, respectively, of the other pair, one of the pairs being arranged above the other of the pairs with the roll of the upper pair adapted to rotate faster than the other roll of the upper pair being positioned with its axis lying approximately in a vertical plane passing between and equidistantly from the rolls of the lower pair, and the other roll of the upper pair and the slow roll of the lower pair being positioned on the same side of the plane, means to adjust the spacing between the rolls of each of the pairs, a doctor disposed along the lowermost generatrix of the roll of each of the pairs adapted to rotate faster than the other roll of the respective pair, and means to cool the rolls, whereby said two pairs of rolls are adapted serially to calender uncured plastic material into a sheet and to feed the thusly shaped sheet to a movable surface adapted to receive the sheet and positioned beneath the lower pair of rolls.

2. Apparatus according to claim 1, in which said means to adjust the spacing between the rolls of each of the pairs is adapted to adjust the rolls of the lower pair to a closer mutual spacing than the rolls of the upper pair, whereby said upper pair is adapted to calender the material into a relatively thick sheet and the lower pair is adapted to calender the sheet formed by the upper pair into a thinner sheet, and the means to rotate the rolls is adapted to rotate the faster rolls at peripheral speeds relative to each other such that the quantity of the material fed from the two pairs of rolls is equal.

(References on following page)

References Cited by the Examiner

UNITED STATES PATENTS

| | | | |
|---|---|---|---|
| 697,217 | 4/1902 | Pearce | 18—2 |
| 1,226,949 | 3/1917 | Clark | 18—9 |
| 1,267,493 | 5/1918 | Young | 18—2 |
| 1,850,450 | 2/1932 | Denmire | 18—2 |
| 2,058,670 | 10/1936 | Doorbar. | |
| 2,078,777 | 4/1937 | Shade | 18—2 |
| 2,085,532 | 6/1937 | Kinsella. | |
| 2,642,014 | 6/1953 | Crosland et al. | 18—2 X |
| 2,994,913 | 8/1961 | Holman | 18—2 |

OTHER REFERENCES

Rasclig: APC Publication, April 1943; 314, 526.

WILLIAM J. STEPHENSON, *Primary Examiner.*